F. BRAMER & O. W. BADGER.
WHEEL-HARROW.
No. 174,767. Patented March 14, 1876.
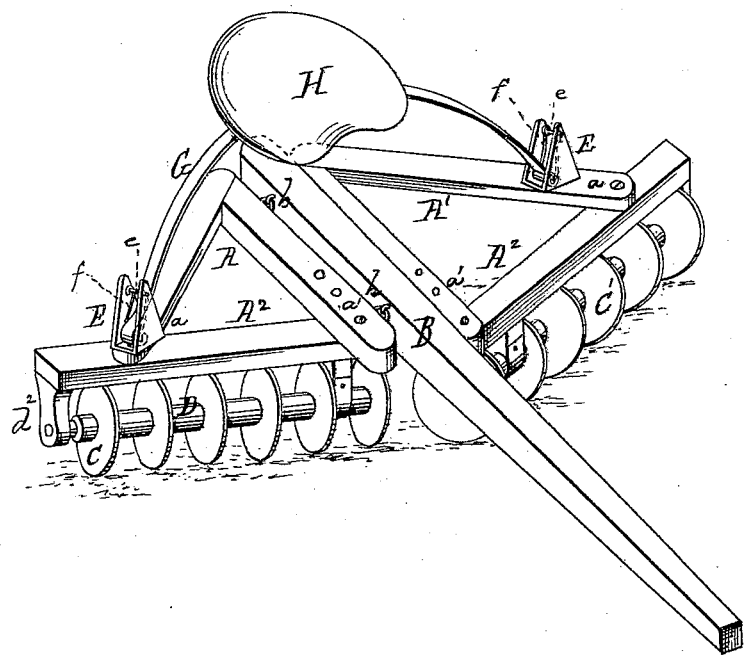
Witnesses:
F. W. Howard
Alex Mahon
Inventors:
Frank Bramer,
Orrin W. Badger,
by A. M. Smith
Attorney

UNITED STATES PATENT OFFICE.

FRANK BRAMER, OF LITTLE FALLS, AND ORRIN W. BADGER, OF WHITNEY'S POINT, NEW YORK; SAID BADGER ASSIGNOR TO SAID BRAMER.

IMPROVEMENT IN WHEEL-HARROWS.

Specification forming part of Letters Patent No. 174,767, dated March 14, 1876; application filed February 4, 1876.

*To all whom it may concern:*

Be it known that we, FRANK BRAMER, of Little Falls, county of Herkimer, and ORRIN W. BADGER, of Whitney's Point, county of Broome, State of New York, have invented certain new and useful Improvements in Wheel-Harrows, of which the following is a full, clear, and exact description, reference being had to the accompanying drawing, making part of this specification, which represents a perspective view of so much of a wheel-harrow as is necessary to show our improvements.

Our invention relates to a novel manner of combining the two wheel gang planks or frames with each other and the intermediate tongue, and to the manner of combining the seat and seat-spring with the hinged wheel-gang frames, whereby the weight of the driver is thrown upon said gang-frames at a point outside of the centers of their length, for causing the weight of the driver to hold the harrows closely to their work without interfering with their freedom of movement in following the uneven surface of the ground over which they are drawn.

The invention consists in extending the rear end of the tongue, or a rigid extension thereof, between the frames of the two opposing wheel-gangs, and hinging said gang pieces or frames thereto, as hereinafter described, whereby the wheel-gangs are adapted to follow the uneven surface of the ground, as hereinafter explained.

The invention further consists in combining the seat with the two hinged gang pieces or frames at points outside of the centers of their transverse length, by means of a transverse-arched plate or spring, which, while applying the weight of the driver at said points for holding the gangs down to their work, does not interfere with the freedom of movement of the gangs in following the surface of the ground.

In the accompanying drawing, A A¹ represent the gang-frames, which may be of any usual construction, but, by preference, are made in the triangular form shown, as giving a strong bracing-frame at a small cost of construction, and with a small amount of material. The gang-bars A² are pivoted to the outer arms or leg $a$ of the frames A A¹, and have their inner ends adjustably connected with the bars $a'$, for permitting the adjustment of the angle of the harrow wheels or disks, relatively to the line of movement of the harrow. The bars $a'$ of the gang-frames lie parallel with each other and with the intermediate tongue B, or with a longitudinal bar or frame forming a rigid extension of said tongue, and to which they are hinged upon opposite sides, the tongue extending between the gang-frames and terminating at their rear ends, as shown. The frames A A¹ are connected with the tongue by any suitable form of hinges, $b$ $b$, adapting them to vibrate freely in conforming to the undulating surface of the ground over which they are drawn, each, as will be seen, independently of the other. The harrow-wheels C C' are of the usual or any preferred construction, and are mounted in gangs upon axles D, which have their bearings in pendent supports $d$, rigidly attached to the bars A² of the gang-frames A A¹. Upon the gang-frames, at a point outside of the center of their transverse length, are secured socket-pieces E, forked or open at their upper ends, and connected by a vertical pivot with the gang-bars, to permit a swiveling movement to compensate for any adjustment in the angle of the gang frames or bars. In the upper end of these forked socket pieces or standards E are mounted horizontal pins $e$, connecting the upper ends of the fork, and from these pins angular or U-shaped stirrups $f$ are suspended by their open ends, within the socket-pieces or forked standards E. The cross-bars of the lower swinging ends of these stirrups have connected with them the opposite ends of a seat-bar, G, by preference made in the arching form shown, and consisting of a stiff spring extending transversely over the tongue B, as shown. The ends of this bar or spring are provided with loops or eyes, the swinging ends of the stirrups $f$ passing through said loops, and forming a hinge-connection therewith. The seat H is connected with the bar G, about midway of its length, in any suitable manner, said seat being raised by the arching form of the spring to a sufficient height above the tongue and gang frames, adapting said tongue and frames, or both, to form a convenient footrest for the driver.

By the arrangement of parts last described, it will be seen that the weight of the driver in his seat H is thrown upon the gang-frames at points outside of their centers, and is thereby made to hold said frames down properly to their work, while the connection of the seat-support with the frames through the medium of the swinging stirrups adapts the frames to vibrate freely on their hinge-connection with the tongue without interference from or the cramping of the seat-support, and without materially disturbing the position of the driver. The bar G also serves to confine the movements or vibrations of the gang planks or frames within certain limits, as by the swinging of the stirrups f outward the bar G is brought into contact with the pins e, from which said stirrups are suspended, and further upward vibration of the gang-frames is prevented.

Having now described our invention, what we claim as new, and desire to secure by Letters Patent, is—

1. The wheel-gang frames or planks, hinged by their inner ends to the intermediate pole or tongue, or a rigid extension thereof, substantially as described.

2. The gang-wheel frames, hinged to the intermediate pole or pole-frame, in combination with the seat-support extending transversely over said pole or frame, and connected with the gang-frames at points outside of the centers of their transverse length, for the purpose and substantially as described.

3. The transverse seat-support or bar connected with the gang-frames by means of the swinging compensating links or stirrups, substantially as described.

4. The combination, with the hinged wheel-gang frames of the swiveling supports E, stirrups f, and transverse seat-support or bar G, arranged and operating substantially as described.

5. The combination of the hinged gang-frames A A¹, intermediate pole or pole-frame B, swiveling standards E, swinging stirrups f, and seat spring or bar G, all arranged and operating as described.

FRANK BRAMER.
ORRIN W. BADGER.

Witnesses to signature of BRAMER:
GERRET DRAKE,
A. L. BURT.

Witnesses to signature of BADGER:
C. S. OLMSTEAD,
L. G. OLMSTEAD.